United States Patent [19]

Cohen et al.

[11] Patent Number: 4,699,464
[45] Date of Patent: Oct. 13, 1987

[54] BEF$_2$-BASED OPTICAL FIBERS

[75] Inventors: Leonard G. Cohen, Berkeley Heights; James W. Fleming, Fanwood, both of N.J.

[73] Assignee: American Telephone and Telegraph Company, AT&T Bell Laboratories, Murray Hill, N.J.

[21] Appl. No.: 831,338

[22] Filed: Feb. 20, 1986

[51] Int. Cl.$^4$ .............................................. G02B 6/16
[52] U.S. Cl. ...................... 350/96.34; 501/37; 501/40; 501/123
[58] Field of Search ............... 350/96.30, 96.31, 96.32, 350/96.33, 96.34; 65/3.11, 3.12, 3.13; 501/37, 40, 123, 151

[56] References Cited

U.S. PATENT DOCUMENTS 4,328,318 5/1982 Mirandy et al. ................... 501/40

OTHER PUBLICATIONS

Bendow et al, "Prospective Vitreous Materials for Infrared Fiber Optics", *Optical Eng.*, vol. 21, No. 1, Jan.-/Feb. 1982, pp. 118–121.
Tebo, "The Promise of the Future", *Electro-Optics*, Jun. 1983, pp. 41–46.
Dumbaugh, "Infrared Transmitting Glasses", *Optical Engineering*, vol. 24, No. 2, Mar./Apr. 1985, pp. 257 and 259–262.
"Fluoride Glasses," K. H. Sun, *Glass Technology*, vol. 20, No. 1, Feb. 1979, pp. 36–40.
"Influence of Waveguide Dispersion in Fluoride Glass Fibres," K. C. Byron, *Electronics Letters*, vol. 18, No. 15, Jul. 22, 1982, pp. 673–674.
*Optical Fiber Telecommunications*, edited by S. E. Miller et al, Academic Press, 1979, pp. 255–257.
"Pulse Broadening in Graded-Index Optical Fibers,"
R. Olshansky et al, *Applied Optics*, vol. 15, No. 2, Feb. 1976, pp. 483–491.
"Fabrication of Long Single-Mode and Multimode Fluoride Glass Fibres by the Double-Crucible Technique," *Electronics Letters*, vol. 21, No. 24, Nov. 21, 1985, pp. 1131–1132, H. Tokiwa et al.
"Fabrication of Fluoride Glass Single-Mode Fibers," Y. Ohishi et al, *Journal of Lightwave Technology*, vol. LT-2, No. 5, Oct. 1984, pp. 593–596.

*Primary Examiner*—John Lee
*Attorney, Agent, or Firm*—Eugen E. Pacher

[57] ABSTRACT

Disclosed is BeF$_2$-based optical fiber. Such fiber can have, in addition to low loss, other advantageous properties. For instance, BeF$_2$-based dispersion shifted single mode fiber can have lower core-cladding index difference and larger core diameter than the corresponding SiO$_2$-based fiber, and BeF$_2$-based graded index multimode fiber can have larger bandwidth than the corresponding SiO$_2$-based fiber. The inventive fibers have a core and a cladding containing at least 30 mol % BeF$_2$, and may contain up to 40 mol % of AlF$_3$, and one or more members of the group consisting of NaF, KF, MgF$_2$, CaF$_2$, PbF$_2$, PF$_5$, and SiF$_4$. An exemplary and currently preferred glass has nominal composition (in mol percent) 30KF-(15-x)CaF$_2$-xPbF$_2$-10AlF$_3$-45BeF$_2$, with $x \leq 15$. Single mode fibers according to the invention have minimum total dispersion in the range 1.5–2.0 μm, and typically have $0.25\% \leq \Delta_{esi} \leq 0.6\%$, and 2.5 μm $\leq a_{esi} \leq 3.4$ μm, where $\Delta_{esi}$ and $a_{esi}$ are the equivalent step index core-cladding index difference and core radius, respectively. Rules and techniques that can advantageously be used to design BeF$_2$-based single mode fibers are also disclosed.

10 Claims, 7 Drawing Figures

FIG. 1
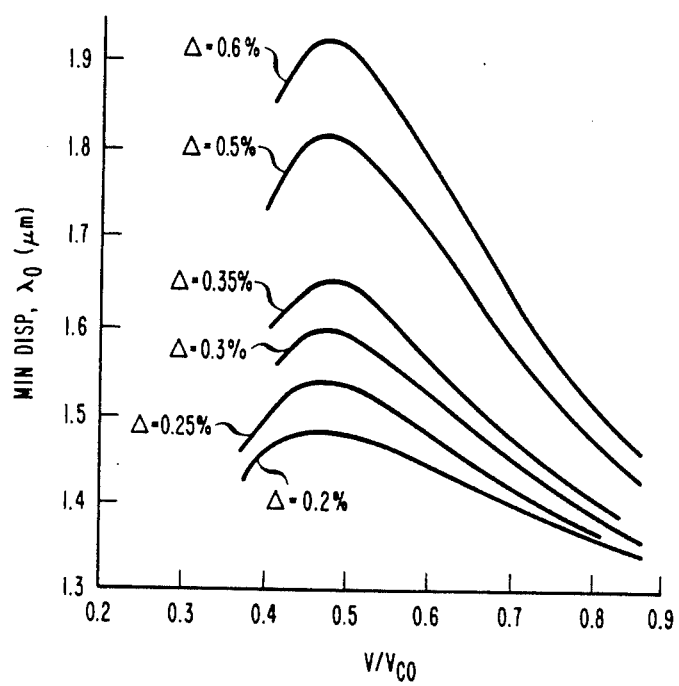
FIG. 1A
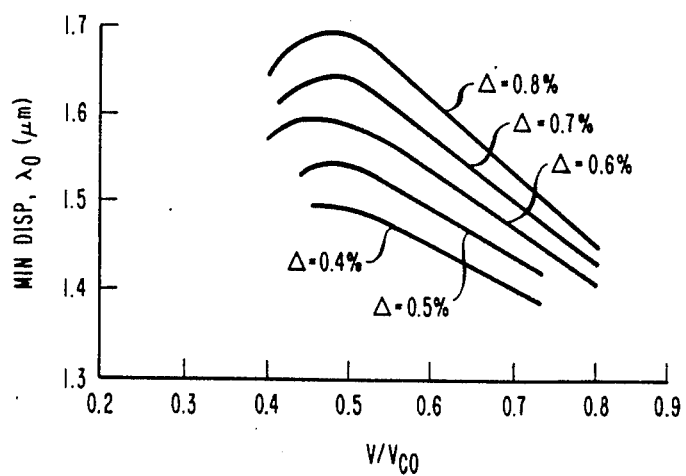
FIG. 1B

SUBSTITUTION OF Pb FOR Ca

BEF₂-BASED OPTICAL FIBERS

FIELD OF THE INVENTION

This invention pertains to optical fibers for telecommunications.

BACKGROUND OF THE INVENTION

Optical fiber is rapidly becoming the transmission medium of choice in many areas of telecommunications, including, for instance, long haul data and voice transmission. Essentially without exception, communications-grade optical fiber currently is silica-based fiber. As is well known, such fiber has a relative loss minimum at about 1.3 $\mu$m, and an absolute minimum at about 1.55 $\mu$m, and these are the wavelengths of currently greatest interest for optical communications purposes.

Even though silica-based optical fiber has reached a high degree of perfection, such that routinely achieved loss figures are close to the expected intrinsic loss of the material, a significant economic incentive still exists for development of lower loss optical fiber. For instance, fiber communications systems that are currently being installed typically have a repeater spacing of the order 20 to 40 km, which can in some cases be as high as 65 km, e.g., in an intercontinental submarine cable system that is soon to be installed. However, many applications exist where the distance between transmitter and receiver is of the order of 100 km to several hundred kilometers, and it would be highly desirable to have available low loss optical fiber which would permit repeaterless transmission over such distances.

Many glass systems have been identified which have substantially lower intrinsic loss than silica. Many of these contain heavy metals and have a refractive index greater than that of silica, but there also exist glasses that have lower intrinsic loss and lower refractive index than silica. Prominent among the latter are the fluoride glasses, and this application is principally concerned with optical fibers based on fluoride glasses containing BeF₂ and having a refractive index that is smaller than that of SiO₂.

The properties of fluoride glasses have been investigated in the past, primarily to determine their suitability for use in high power laser systems. From such investigations, it is known that the fluoride glasses tend to have relatively small linear and non-linear refractive indices, and frequently are transparent over a wide spectral region in the near to mid-infrared (see, for instance, K. H. Sun, *Glass Technology*, Volume 20(1), February 1979, pages 36–40).

Fluoride glasses are also known to have properties which make them potentially attractive for optical fibers. In particular, the intrinsic loss of these glasses is projected to be significantly less than that of silica, with minimum intrinsic losses of the order of $10^{-3}$ dB/km predicted from theory. Recently, results of research into possible designs of heavy metal fluoride glass optical fibers have been published. See, for instance, K. C. Byron, *Electronics Letters*, Vol. 18(15), pages 673–674 (1982), wherein it is reported that in such fibers the wavelength of zero total dispersion can be shifted over a relatively wide frequency range, that such fibers can have a relatively low slope of total dispersion as a function of wavelength, and that the total dispersion can be kept to a very small value over a relatively wide spectral region.

Attempts have also been made at the fabrication of heavy metal fluoride glass single mode optical fibers. For instance, Y. Ohishi et al, *Journal of Lightwave Technology*, Vol. LT-2(5), pages 593–596 (1984), report on the manufacture of single mode optical fiber using ZrF₄-based on fluoride glasses.

Heavy metal fluoride glasses typically have refractive indices greater than the refractive index of silica, and typically have minimum intrinsic loss at a wavelength larger than about 2 microns. Telecommunication systems using optical fiber made from heavy metal fluoride glass thus are expected to operate at wavelengths greater than about 2 microns, for which appropriate sources and detectors do not yet exist. On the other hand, BeF₂-based fluoride glass is predicted to have minimum loss at about 2 microns, and lower intrinsic loss than silica over the range 1.5–2 $\mu$m. Since sources and detectors for these wavelengths either exist or can be produced by adapting existing technologies, communications systems that use BeF₂-based fluoride glass fiber as the transmission medium and that operate in the 1.5–2 $\mu$m wavelength region offer advantages over both prior art SiO₂-based systems and proposed systems that use heavy metal fluoride glass fibers. However, such fibers can be expected to have different parameters (e.g., core radius a and core-cladding index difference $\Delta$) than prior art SiO₂-based fibers. It would thus be advantageous to have available design criteria and a process for designing BeF₂-based optical fibers having a predetermined wavelength of minimum dispersion $\lambda_o$ in the range 1.5–2.0 $\mu$m. This application discloses such criteria and such a process. It also discloses BeF₂-based optical fibers that embody the criteria.

BRIEF DESCRIPTION OF THE DRAWINGS

FIGS. 1A and B present curves of the minimum dispersion wavelength $\lambda_o$ as a function of the normalized V-number ($V/V_o$), for single mode step index BeF₂-based and SiO₂-based fiber, respectively;

THE INVENTION

Figure 2:
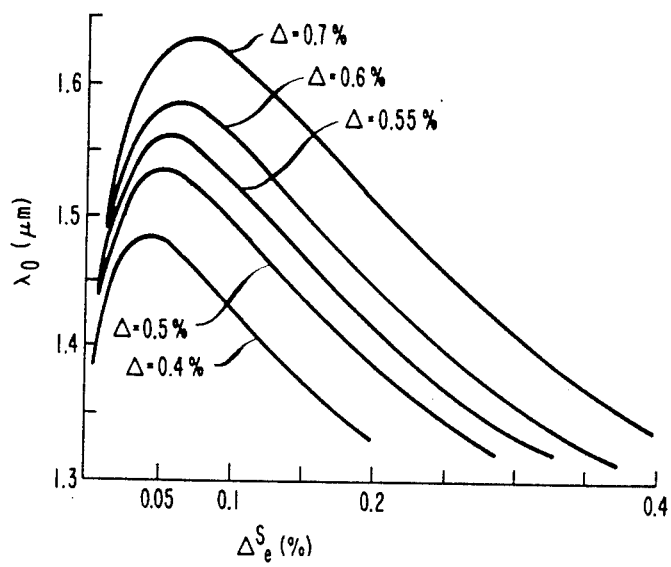
FIG. 2 gives curves that relate $\lambda_o$ and $\Delta_e{}^s$, the effective core-cladding index difference of SiO₂-based step index single mode fiber.

BeF₂, which has been extensively investigated for laser application, has apparently not been considered previously for use in optical fiber. One reason for this neglect probably is the fact that BeF₂ is hygroscopic. It is known, however, that addition of other fluorides (e.g., CaF₂, MgF₂) to BeF₂ increases the resistance to moisture attack, even though such addition increases the tendency of the glass for devitrification. See, for instance, K: H. Sun (op. cit.). It has previously been reported that in binary and ternary fluoride glass systems containing BeF₂ at least 40 mol% of BeF₂ has to be present in order to form a glass. Such glasses are known not to be resistant to moisture attack. On the other hand, K. H. Sun (ibid) reports the fabrication of a moisture resistant fluoride glass containing AlF₃ and as little as 20% $BeF_2$. All compositional percentages herein are mol%, unless noted otherwise.

We have found $BeF_2$-based glasses to have optical properties that, we believe, make such glasses useful materials for optical fiber, in particular, for optical fiber systems operating at a wavelength (or wavelengths) in the spectral region between about 1.5 and about 2 $\mu$m. Among these optical properties are low intrinsic loss, low refractive index, and low refractive index dispersion, all relative to $SiO_2$. Furthermore, we have found that such materials can have acceptable resistance to atmospheric corrosion, and are excellent glass formers.

Glasses of concern in this application contain at least about 30% $BeF_2$. They may also contain up to about 40% $AlF_3$, and, optionally, one or more members of the class consisting of NaF, KF, $MgF_2$, $CaF_2$, $PbF_2$, $PF_5$, and $SiF_4$. Typically, the aforementioned constituents make up at least 95% of the glass.

Some preferred glasses according to the invention have compositions described by the expression: $wX$-$(30-x)CaF_2$-$xPbF_2$-$yAlF_3$-$zBeF_2$, wherein X is at least one member of the class consisting of KF, $MgF_2$ and NaF, and wherein $0 < w \leq 40\%$, $0 \leq x \leq 30\%$, $0 < y \leq 20\%$, and $30 \leq z \leq 60\%$. The glasses provide a range of optical properties by compositional variation within the indicated ranges, especially by Pb-Ca substitution, and are resistant to environmental corrosion.

Particularly preferred glasses have composition $w'KF$-$(20-x')CaF_2$-$x'PbF_2$-$y'AlF_3$-$z'BeF_2$, with $20 \leq w' \leq 40\%$, $0 \leq x' \leq 20\%$, $5 \leq y' \leq 15\%$, and $40 \leq z' \leq 50\%$. Exemplary preferred glasses have the nominal composition $30KF$-$(15-x'')CaF_2$-$x''PbF_2$-$10AlF_3$-$45BeF_2$, with $0 \leq x'' \leq 15\%$.

Inventive glasses that contain more than about 60% $BeF_2$ may require protection from the environment, due to their hygroscopic nature. Such protection can be provided, for instance, by deposition of such glass on the inside of an environmentally stable glass tube, and collapse of the composite tube.

Glass according to the invention not only has a relatively small refractive index but also a relatively small value of $dD_m(\lambda)/d\lambda$, where $D_m(\lambda)$ is the material dispersion of the glass, and $\lambda$ is the wavelength. These advantageous properties lead to certain fiber design consequences which will be discussed below.

In one aspect, this invention is concerned with single mode optical fiber that comprises a core of radius a that is contactingly surrounded by a cladding, with both the core and the cladding consisting of $BeF_2$-based glass according to the invention. The cladding has refractive index $n_2$, the core has a maximum refractive index $n_1$, with $n_2 < n_1 < n^s$, where $n^s$ is the refractive index of fused silica. It is to be understood that refractive indices are always to be compared at the same wavelength. The core has a nominal refractive index profile, which can be represented, for instance, by the well-known expression $$n(r) = n_1[1 - 2\Delta(r/a)^\alpha]^{\frac{1}{2}},$$

with $r \leq a$, $0 < \alpha \leq \infty$, preferably $\alpha \geq 1$, and with the core-cladding refractive index difference $\Delta$ being approximately equal to $(n_1 - n_2)/n_1$. As is well known, $\alpha = \infty$ corresponds to a step profile, $\alpha = 2$ to a parabolic profile, and $\alpha = 1$ to a triangular profile. It will be appreciably that an actual fiber profile unavoidably differs to some extent from the corresponding nominal profile, and that the transmission characteristics of optical fiber can always be determined numerically, regardless of profile shape.

Associated with the inventive single mode fiber is a total dispersion $D_t(\lambda)$, a material dispersion $D_m(\lambda)$, and a material dispersion slope $dD_m(\lambda)/d\lambda$. The absolute value of the total dispersion and of the material dispersion has a minimum at wavelength $\lambda_o$ and at $\lambda_m$, respectively, with $\lambda_m < \lambda_o$. Such fiber is known as dispersion shifted single mode fiber, and utilizes the fact that fiber can be designed such that the waveguide dispersion shifts the minimum of the total dispersion towards longer wavelengths by a predetermined amount. An important fiber parameter is the normalized frequency or V-number, which can be defined as follows:

$$V = (2\pi a n_2/\lambda)(2\Delta)^{\frac{1}{2}}.$$

As is well known, a step index fiber will support only one guided mode for $V \leq 2.405$, and more than one guided mode for $V > 2.405$. The wavelength corresponding to $V = 2.405$ is referred to as the cut-off wavelength, and the V-number corresponding to cut-off is designated herein as $V_o$. For profiles with $\alpha \neq \infty$, $V_o = 2.405(1 + 2/\alpha)^{\frac{1}{2}}$. The $V_o$ for other than power law profiles can be determined by numerical computation.

It is also well known that for any single mode fiber having an index profile such that $\alpha \neq \infty$, it is possible to determine an equivalent step index profile having a core-cladding index difference $\Delta_{esi}$ that differs from the core-cladding index difference of the actual fiber. The equivalent step index profile has index difference $$\Delta_{esi} = (1/n_2^2) \int_0^1 (n^2(\bar{r}) - n_2^2)\bar{r}d\bar{r},$$

and core radius $$a_{esi} = a(2.405/V_o)(\Delta/\Delta_{esi})^{\frac{1}{2}},$$

where $\bar{r} = r/a$. For example, when $\alpha = 1$, $\Delta_{esi} = 2\Delta/3$, and $a_{esi} = a/\sqrt{2}$. Because an equivalent step index profile can always be determined for any single mode fiber, and because the inverse process can also be carried out, no loss of generality results from a restriction of the discussion herein to the design of step index single mode fiber.

As was pointed out above, the wavelength of minimum dispersion $\lambda_o$ of an optical fiber is an important fiber parameter, since, in order to achieve high bandwidth and long repeater spacings, the operating wavelength of high capacity long haul systems advantageously is chosen at or near $\lambda_o$.

We have made the unexpected discovery that curves of $\lambda_o$ for different values of index difference $\Delta$, assume a "universal" shape when plotted as a function of the normalized V-number ($V/V_o$). This is illustrated in FIGS. 1A) and B), which show $\lambda_o$ as a function of $V/V_o$ for exemplary $BeF_2$-based step index fiber and for $SiO_2$ step index fiber, respectively. As can be seen, the curves for both materials are of similar shape, in all cases having their maximum at $V/V_o \sim 0.48$. We have found such curves of $\lambda_o$ vs. $V/V_o$ to be useful tools in the design of optical fibers based on new glass systems, and, in particular, for the $BeF_2$-containing optical fibers according to the invention.

An advantageous general approach to the design of fibers according to the invention that does not require extensive computation is to first select the desired wavelength of minimum total dispersion $\lambda_o$, then to determine (from relationships provided herein) the appropriate index difference and core diameter of a (step index) silica-based reference fiber having the desired value of $\lambda_o$, and, finally, with the aid of relationships that are also provided herein, to determine the parameters of the BeF$_2$-based inventive fiber from those of the reference fiber. The approach thus uses well-established methods and criteria for designing silica-based fiber in the design of the inventive fiber. By "silica-based" fiber we mean herein a fiber having an essentially undoped SiO$_2$ cladding and an appropriately up-doped core.

We will now demonstrate the design procedure for an exemplary BeF$_2$-based single mode fiber having $\lambda_o = 1.55$ μm. It will be appreciated that the same approach can be used for fiber having any other $\lambda_o$ in the range under consideration herein.

Figure 5:
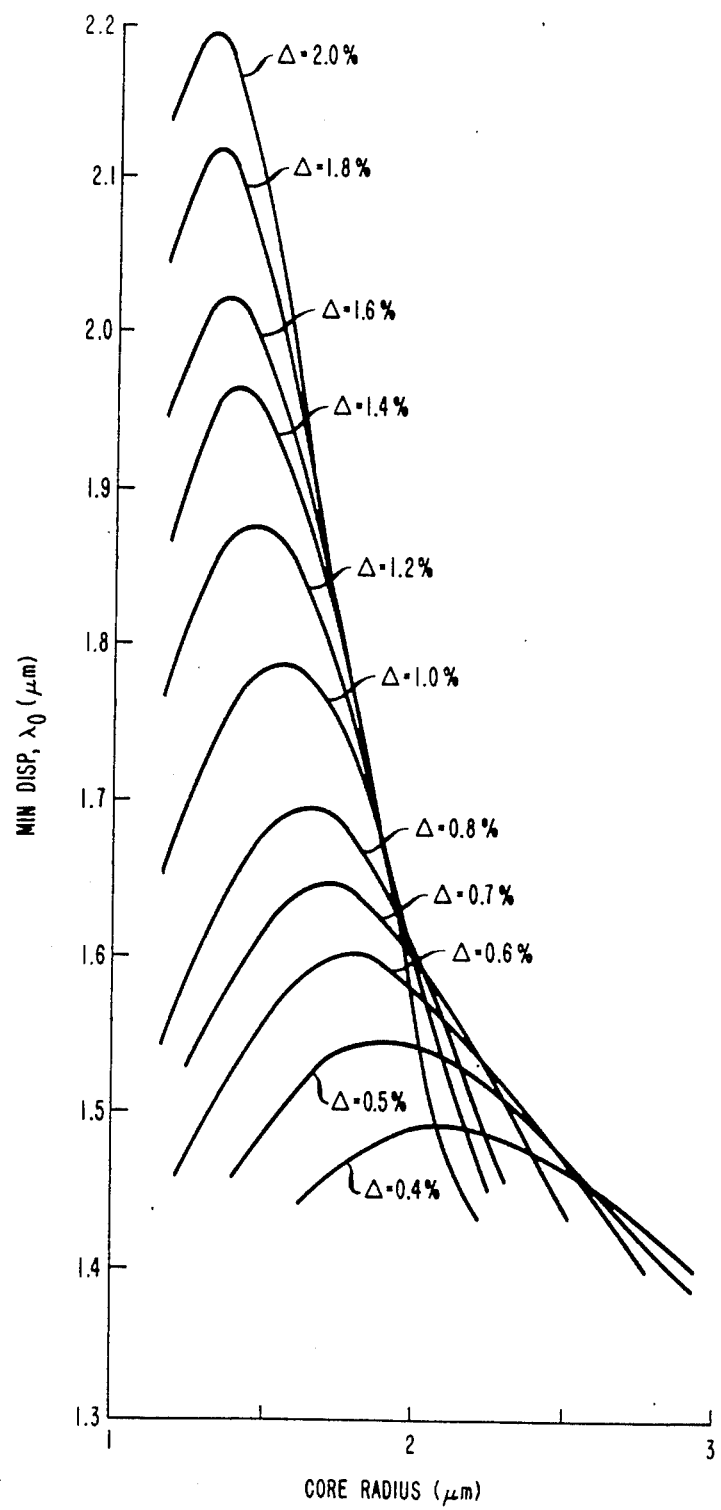

FIG. 1B shows that the SiO$_2$-based reference fiber must have $\Delta^s \geq 0.54\%$, in order to have $\lambda_o = 1.55$ μm (the superscript s herein always refers to parameters that pertain to the silica-based reference fiber). The reference fiber core radius corresponding to $\Delta_{min}{}^s$, the minimum allowed $\Delta^s$, can be determined from FIG. 5, or from the expression $$a_m{}^s = 0.58 \lambda_o / \pi n^s (2\Delta_{min}{}^s)^{\frac{1}{2}},$$

with $n_s =$ the refractive index of SiO$_2$ at $\lambda_o$.

Choosing $\Delta^s = \Delta_{min}{}^s$ maximizes the dimensional tolerances of the fiber, thus increasing the manufacturability of the design, since small variations in core radius have negligible effect on $\lambda_o$. However, this choice may result in a fiber having relatively high bending loss, and therefore $\Delta^s$ typically is chosen to be greater than $\Delta_{min}{}^s$.

In order for fiber to have low bending loss the effective core/cladding index difference $\Delta_e$ typically should be at least 0.05%, preferably $\geq 0.1\%$, and FIG. 2 shows curves that relate the actual and the effective core/cladding index difference for SiO$_2$-based step index fiber. For instance, in order for $\Delta_e{}^s$ to be 0.1% it is necessary that $\Delta^s \sim 0.57\%$ (for $\lambda_o = 1.55$ μm). Referring to FIG. 1B one sees that $V/V_o \sim 0.56$. Using FIG. 5, or definition of V, one finds that $a^s = 2.15$ μm for this choice of $\Delta_e{}^s$. In general, it is desirable to choose the largest possible core radius, consistent with a core-cladding index difference that is manufacturable and that results in acceptable bending losses in the fiber.

This concludes the first part of the exemplary design procedure, namely, the design of the silica-based reference fiber. The second part of the design procedure involves the determination of the parameters of the BeF$_2$-based fiber (in particular, core radius $a_{esi}$ and equivalent step index core/cladding difference $\Delta_{esi}$) from the reference fiber parameters.

In general, we have found that single mode Be$_{F2}$-containing optical fibers according to the invention typically have a core-cladding refractive difference and a core radius such that $$0.5\Delta^s \leq \Delta_{esi} < \Delta^s,$$

and $$a_{esi} > (a^s n_2{}^s / n_2).$$

Furthermore, our work indicates that, for fibers according to the invention, it is typically advantageous to choose $\Delta_{esi}$ and $a_{esi}$ in the ranges 0.25–0.6% and 2.5–3.4 μm, respectively.

SiO$_2$-based reference fibers typically have $\Delta^s > 0.5\%$, and $1.5 < a^s < 2.2$ μm. Thus it is evident that the inventive BeF$_2$-based fiber can have substantially lower core-cladding difference and substantially larger core radius than SiO$_2$-based fiber. As will be appreciated by those skilled in the art, a smaller index difference is advantageous because it implies a lower doping level, and therefore lower Rayleigh scattering loss, and a larger core diameter is advantageous because, inter alia, it makes it easier to achieve low loss fiber splices.

Figure 3:
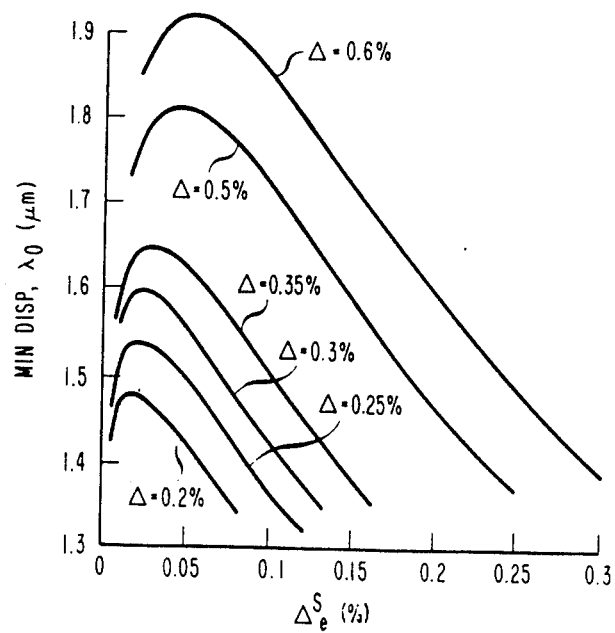
FIG. 3 similarly gives curves that relate $\lambda_o$ and $\Delta_e$, the effective core-cladding index difference of BeF₂-based single mode fiber.

As is well known to those skilled in the art, the effective index difference of the fundamental mode in optical fiber is defined by $\Delta_e = \beta/k_o$, where $\beta$ and $k_o$ are the fundamental mode propagation constants in the lightguide and in free space, respectively. It is a weighted average between the core and cladding indices, and can always be determined numerically. FIG. 3 shows exemplary curves that relate $\Delta_e$ and $\lambda_o$, for various values of $\Delta$, for BeF$_2$-containing step index fibers according to the invention. Entering FIG. 3 with the previously selected values of $\lambda_o$ and $\Delta_e$ permits determination of $\Delta_{esi}$ for the inventive fiber that is to be designed. For instance, if $\lambda_o = 1.55$ μm, and $\Delta_e = 0.1\%$, then $\Delta_{esi} = 0.38\%$.

Figure 4:
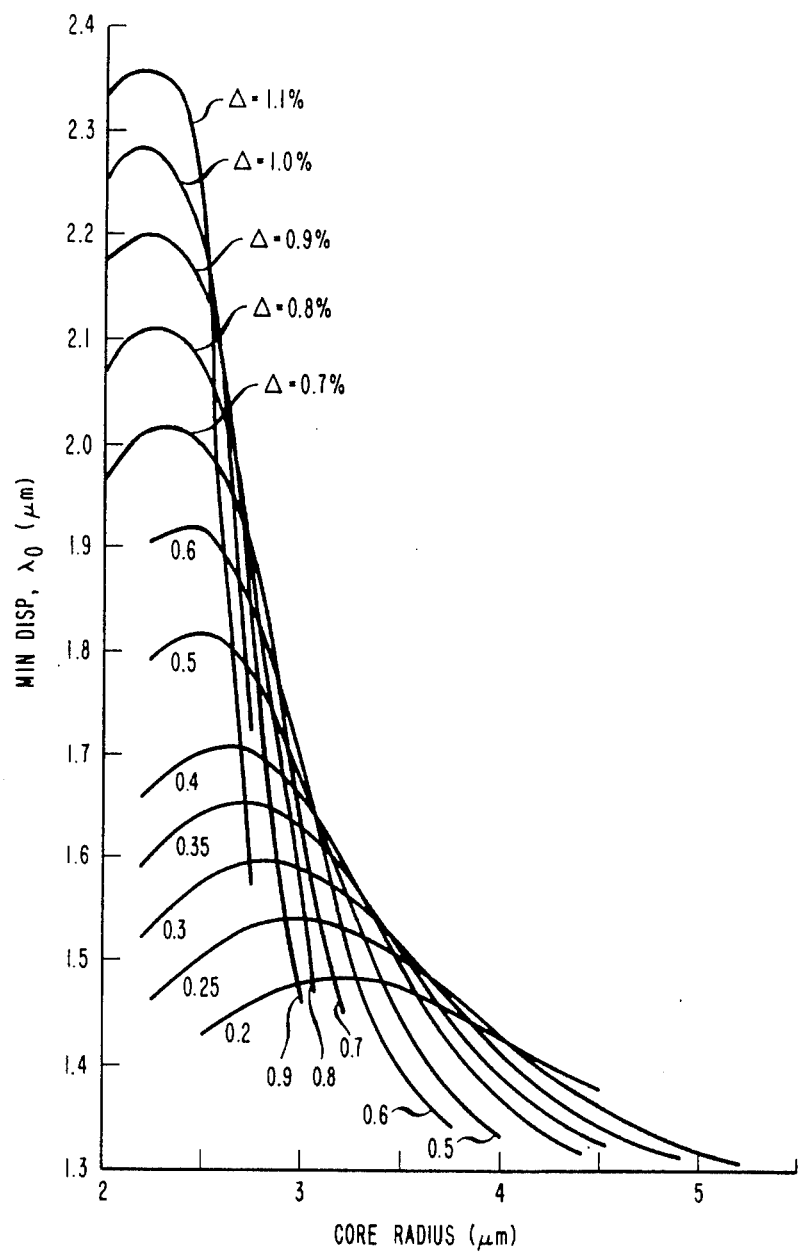
FIGS. 4 and 5 show curves of $\lambda_o$ as a function of core radius of Be$_{F2}$-based and SiO₂-based single mode step index optical fiber, respectively.

With the core/cladding index difference of the equivalent step index BeF$_2$-containing fiber thus determined, the core radius can be found with the aid of FIG. 4, which contains curves relating core radius and $\lambda_o$, for various values of $\Delta_{esi}$. For instance, $\lambda_o = 1.55$ μm and $\Delta_{esi} = 0.38\%$ requires that the core radius $a_{esi}$ be about 3.3 μm. This concludes the determination of the parameters of the equivalent step index profile of the single mode fiber according to the invention by the novel design procedure.

If a profile other than a step index profile is to be used, then the parameters of the actual profile can easily be derived from $\Delta_{esi}$ and $a_{esi}$. For instance, fiber having a triangular core profile ($\alpha = 1$) has $\Delta = 3\Delta_{esi}/2$, and $a = (\sqrt{2}) a_{esi}$.

Given the desired $\lambda_o$ and $\Delta_{esi}$, as well as the refractive index of the glass to be used for a fiber according to the invention, together with $\Delta_{esi}{}^s$ and $a^s$, it is also possible to determine the appropriate radius $a_{esi}$ directly by means of the following simple relationship, discovered by us during the course of our work:

$$a_{esi} = (a^s n^s / n_2)(\Delta^s / \Delta_{esi})^{\frac{1}{2}}$$

Not only does the use of BeF$_2$-containing glass according to the invention make possible the design of single mode, dispersion shifted optical fibers having, inter alia, relatively large core and relatively low refractive index difference, but it also can result in graded index multimode fibers having high bandwidth over a relatively large range of wavelengths.

As is well known, in multimode fibers intermodal dispersion can severely limit the bandwidth. Grading of the core profile can substantially reduce intermodal dispersion. However, the bandwidth B (which is inversely proportional to pulse dispersion) typically sharply peaks at some wavelength $\lambda_m$ at which the value of the profile shape parameter $\alpha = \alpha_m$, the optimal profile shape parameter for that wavelength. See, for instance, *Optical Either Telecommunications*, S. E. Miller and A. G. Chynoweth, editors, Academic Press (1979), pp. 255–257). The value of $\alpha_m$ is a function of wavelength. This effect is referred to as profile dispersion. See, for instance, R. Olshansky et al, *Applied Optics,* Vol. 15(2), pp. 483–491 (1976). In typical prior art multimode optical fibers, profile dispersion causes $\alpha_m$ to differ by more than 5% from the $\alpha$ of the fiber if $\delta\lambda = |\lambda - \lambda_m| \geq 0.2$ μm. This difference between $\alpha$ and $\alpha_m$ causes the fiber bandwidth to decrease to about $1.7\Delta$ GHz·km (for $\delta\lambda = 0.2$ μm), with $\Delta$ being the core-cladding index difference in percent.

We have discovered that BeF$_2$-based multimode fiber can have much smaller profile dispersion than prior art fiber having the same $\alpha$ and $\Delta$, making possible the design of graded index multimode fibers of greatly increased bandwidth. Thus, $B > 1.7\Delta$ GHz·km for $\delta\lambda \leq 0.2$ μm, preferaby $B > 2\Delta$ GHz km for $\delta\lambda \leq 0.2$ μm.

Figure 6:
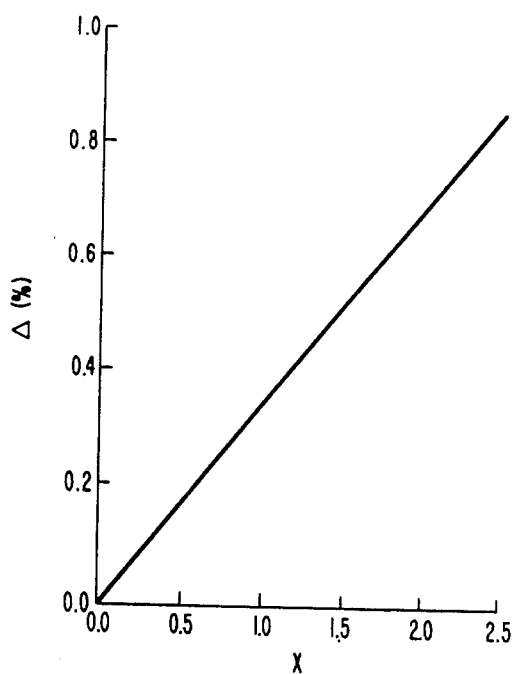
FIG. 6 gives data on the change of refractive index of exemplary BeF₂-based glass that results from Pb/Ca substitution.

The refractive index of BeF$_2$-containing glass according to the invention depends on the chemical composition of the glass, and thus the desired refractive index profile can be produced by appropriate variation of the chemical composition. A particularly advantageous approach involves substitution of Pb for Ca, and FIG. 6 shows the core-cladding index difference $\Delta$ in step index fiber of composition 30KF-(15-x)CaF$_2$-xPbF$_2$-10AlF$_3$-45BeF$_2$ where x indicates the mol% of PbF$_2$ in the fiber core, and x=0 in the cladding.

BeF$_2$-based fiber according to the invention can be fabricated by any appropriate process, including the double crucible (see, for instance, H. Tokiwa et al, *Electronics Letters,* Vol. 21(24), pp. 1131–1132 (1985)) and the rod-in-tube process, as well as by vapor phase processes (e.g., MCVD) especially vapor phase processes that use organometallic precursors such as ketonates or alkoxides.

When using processes such as the rod-in-tube or the double crucible process, diffusion (in-diffusion or out-diffusion) of a selected element can be used to obtain a graded core index profile. For instance, Pb/Ca ion exchange could be used to selectively remove Pb from a PbF$_2$ containing core rod prior to its insertion into the PbF$_2$-free cladding tube. Fusing such a rod concentrically within the tube results in a preform having a graded index core. The rod as well as the tube can be produced by known methods, e.g., by casting or extrusion.

When using an inside vapor deposition process such as MCVD, it is typically necessary to use a substrate tube made of a material that is chemically stable (i.e., not subject to environmental corrosion) and whose thermophysical properties (e.g., coefficient of thermal expansion) sufficiently match those of the BeF$_2$-containing glass to be deposited thereon. Multicomponent silica glass (e.g., sodium borosilicate glass) meets these requirements and is thus an exemplary substrate material.

Example

Step index optical fiber, with $\Delta \sim 0.4\%$, is prepared as follows: KF, CaF$_2$, PbF$_2$, Al$_2$F$_6$·(H$_2$O)$_x$ and (NH$_4$)$_2$BeF$_4$ powders (<325 mesh) of 6N purity, in mol ratio 30:13.8:1.2:10:45, are introduced into a silica beaker and wet mixed, using anhydrous alcohol. The resulting mixture is dried, thereby producing a powder. The powder is placed into a fused silica crucible, which in turn is put into a cooling assembly within an RF coil. The charge in the crucible is initially heated by means of a graphite susceptor within a fused silica protective tube. After coupling of RF to the charge is achieved, the charge is RF heated to 1100° C. for 20 minutes. The crucible is then removed from the heating assembly and the still very fluid charge poured into a heated (200° C.) graphite cylindrical mold (8 mm inner diameter) and allowed to solidify, resulting in a core rod of about 8 mm diameter and refractive index of about 1.337. A cladding tube is produced by substantially the same procedure, except that the powder mixture contains 15 mol% CaF$_2$ and no PbF$_2$, and that the charge is poured into a cylindrical mold of 125 mm inner diameter, with a 8.5 mm diameter concentric cylindrical inset. The cladding tube refractive index is about 1.332. The core rod is inserted into the cladding tube, and fiber is drawn from the assembly in the conventional manner.

What is claimed is:

1. A single mode optical fiber comprising a core and a first cladding contactingly surrounding the core, the core having a radius a and a maximum index of refraction $n_1 < n^s$, where $n^s$ is the refractive index of fused silica, the first cladding having a refractive index $n_2$, with $n_2 < n_1$, the fiber having minimum total dispersion at wavelength $\lambda_o$ and minimum material dispersion at $\lambda_m < \lambda_o$, and associated with the fiber is a refractive index profile and a profile exponent $\alpha$, with $1 < \alpha \leq \infty$, an equivalent step index core-cladding index difference $\Delta_{esi}$, and an equivalent step index core radius $a_{esi}$, characterized in that
   (a) at least the fiber core and the first cladding consist substantially of a glass that comprises at least 30 mol% BeF$_2$;
   (b) $1.5 \leq \lambda_o \leq 2$ μm;
   (c) $0.5\Delta^s \leq \Delta_{esi} < \Delta^s$; and
   (d) $a_{esi} > a^s n^s / n_2$;
   wherein $\Delta^s$ and $a^s$ are the refractive index difference and the core radius, respectively, of a silica-based step-index reference fiber having minimum total dispersion at wavelength $\lambda_o$, with all quantities in (c) and (d) referring to wavelength $\lambda_o$.

2. Optical fiber of claim 1, wherein the glass further comprises up to about 40 mol% AlF$_3$.

3. Optical fiber of claim 2, wherein the glass further comprises at least one member of the fluoride group consisting of NaF, KF, MgF$_2$, CaF$_2$, PbF$_2$, PF$_5$, and SiF$_4$, with BeF$_2$, AlF$_3$, and the at least one member of the fluoride group constituting at least 95 mol% of the glass.

4. Optical fiber of claim 3, wherein the glass is substantially of composition wX-(30-x)CaF$_2$-xPbF$_2$-yAlF$_3$-zBeF$_2$, with X being at least one member of the group consisting of KF, MgF$_2$, and NaF, and wherein $0 < w \leq 40\%$, $0 \leq x \leq 30\%$, $0 < y \leq 20\%$, and $30 \leq z \leq 60\%$, all percentages being mol percent.

5. Optical fiber of claim 4, wherein the glass is substantially of composition 30KF-(15-x')CaF$_2$-x'PbF$_2$-10AlF$_3$-45BeF$_2$, with $0 \leq x' \leq 15$.

6. Optical fiber of claim 1, wherein $a_{esi} = (a^s n^s / n_2)(\Delta^s / \Delta_{esi})^{\frac{1}{2}}$.

7. A single mode optical fiber comprising a core and a first cladding contactingly surrounding the core, the core having a radius a and a maximum index of refraction $n_1$, the first cladding having a refractive index $n_2 < n_1$, the fiber having minimum total dispersion at a wavelength $\lambda_o$ and minimum material dispersion at $\lambda_m < \lambda_o$, and associated with the fiber is an equivalent step index core radius $a_{esi}$ and an equivalent step index core-cladding index difference $\Delta_{esi}$;
   characterized in that (a) at least the fiber core and the first cladding consist substantially of a glass that comprises at least 30 mol% $BeF_2$;

(b) $1.5 \leq \lambda_o \leq 2$ μm;

(c) $0.25\% \leq \Delta_{esi} \leq 0.6\%$; and (d) $2.5$ μm $\leq a_{esi} \leq 3.4$ μm.

8. A multimode optical fiber comprising a core and a first cladding contactingly surrounding the core, the core having a refractive index $n_1$, the first cladding having a maximum refractive index $n_2 < n_1$, and a core-cladding index difference $\Delta$, the fiber having maximum bandwidth at $\lambda_m$, characterized in that (a) at least the fiber core and the first cladding consist substantially of a glass that comprises at least 30 mol% $BeF_2$;

(b) the bandwidth of the fiber is greater than $(1.7\Delta)$ GHz km for all wavelengths $\lambda$ in the range $|\lambda - \lambda_m| \leq 0.2$ μm, with $\Delta$ being in percent.

9. Multimode optical fiber of claim 8, wherein the glass substantially has the composition $wX$-$(30-x)CaF_2$-$xPbF_2$-$yAlF_3$-$zBeF_2$, with X being at least one member of the group consisting of KF, $MgF_2$, and NaF, and wherein $0 < w \leq 40\%$, $0 \leq x \leq 30\%$, $0 < y \leq 20\%$, and $30 \leq z \leq 60\%$, all percentages being mol percent, and wherein the bandwidth of the fiber is greater than $2\Delta$ GHz·km for all $\lambda$ in $|\lambda - \lambda_m| \leq 0.2$ μm.

10. Multimode optical fiber of claim 9, wherein the glass is substantially of composition $30KF$-$(15-x')CaF_2$-$x'PbF_2$-$45BeF_2$, with $x' \leq 15$.

* * * * *